United States Patent Office 3,492,321
Patented Jan. 27, 1970

3,492,321
CYCLOPROPENYL ESTRA, -1,3,5(10)-TRIENES
Pierre Crabbe, Mexico City, Mexico, assignor to Syntex Corporation, Panama, Panama, a corporation of Panama
No Drawing. Filed Jan. 22, 1968, Ser. No. 699,291
Int. Cl. C07c 169/10, 169/06; A61k 17/00
U.S. Cl. 260—397.4
23 Claims

ABSTRACT OF THE DISCLOSURE 17-ethynyl- and 17-(1'-propynyl)-estra-1,3,5(10)-trienes are reacted with a dihalocarbene generating agent to afford new dihalomethylene derivatives and new cyclopropenyl derivatives useful as estrogenic agents.

---

This invention relates to novel cyclopentanophenanthrene derivatives. More particularly, the present invention relates to novel cyclopentanophenanthrene derivatives which are obtained by the reaction of a 17-ethynyl-estra-1,3,5(10),16-tetraene or a 17-(1'-propynyl)-estra-1,3,5(10),16-tetraene with a dichlorocarbene or difluorocarbene generating agent such as sodium chlorodifluoroacetate or sodium trichloroacetate.

These novel cyclopentanophenanthrene derivatives are represented by the following formulas:

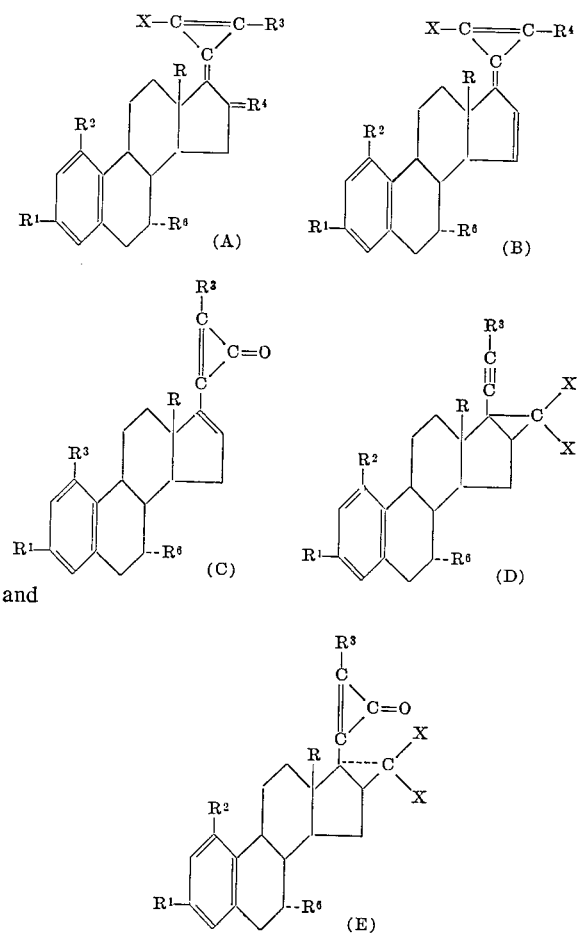

wherein,

X is chloro or fluoro;
R is methyl or ethyl;
$R^1$ is hydroxy and the hydrolyzable esters thereof, lower alkoxy, tetrahydropyran-2'-yloxy, tetrahydrofuran-2'-yloxy, cyclopentyloxy or cyclohexyloxy;
$R^2$ is hydrogen, methyl, hydroxy and the hydrolyzable esters thereof, lower alkoxy, tetrahydropyran-2'-yloxy, tetrahydrofuran-2'-yloxy, cyclopentyloxy or cyclohexyloxy;
$R^3$ is hydrogen or methyl;
$R^4$ is oxo or the group

in which $R^5$ is hydrogen, hydroxy and the hydrolyzable esters thereof, chloro or fluoro; and
$R^6$ is hydrogen or methyl.

The term "conventional hydrolyzable esters," as used herein, denotes those hydrolyzable ester groups conventionally employed in the steroid art, preferably, those derived from hydrocarbon carboxylic acids or phosphoric acids and their salts. The term "hydrocarbon carboxylic acid," defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylaceate, cyclopenylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperdinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

The term "lower alkoxy," as used herein, refers to a straight or branched chain alkoxy group having one to about six carbon atoms such as methoxy, ethoxy, and the like.

As mentioned above, the novel compounds of the present invention are obtained by the reaction of a dihalocarbene generating agent with a 17-(ethynyl) or 17-(1'-propynyl-estra-1,3,5(10),16-tetraene of the following formula:

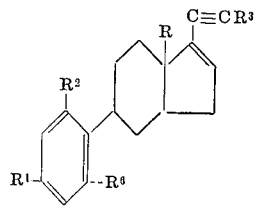

(II)

wherein,

R, $R_1$, $R_2$, $R_3$ and $R_6$ are the same as defined above.

In the practice of the process, a $\Delta^{16}$-17-(1'-propynyl) or $\Delta^{16}$-17-ethynyl estratriene is reacted with a dihalocarbene generating agent such as sodium chlorodifluoroacetate or sodium trichloroacetate in an inert solvent such as diglyme at reflux temperature for a period of time of about 15 minutes or longer. The reaction furnishes a mixture of compounds, namely, the compounds of formulas B, C, D, E and A (wherein $R^4$ is the group

in which $R^5$ is hydroxy, fluoro or chloro). The novel compounds of formula A wherein $R^4$ is oxo are obtained by oxidation of the corresponding 16α-hydroxy compound obtained in the foregoing reaction. This oxidation can be accomplished using, for example, chromium trioxide in pyridine at about room temperature for about 16 hours or more.

The $\Delta^{16}$-17 ethynyl and $\Delta^{16}$-17-(1'-propynyl) starting material of Formula II above can be obtained by treating a 17β-hydroxy-17α-ethynyl and 17β-hydroxy-17α-(1'-propynyl)-estra-1,3,5(10)-triene, respectively, with acetic acid and acetic anhydride in the presence of p-toluenesulfonic acid at about room temperature for about one to several hours. This conversion can be illustrated as follows:

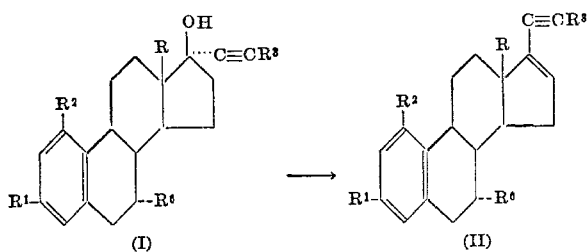

In the above formulas, R, $R^1$, $R^2$, $R^3$ and $R^6$ are as defined above.

The substituent in the 1-position and the 3-position of the estratriene nucleus of the compounds of the present invention can be a hydroxy group or an etherified, e.g. methoxy, tetrahydropyranyloxy, etc.; esterified, e.g. acetoxy, benzoyloxy, etc., derivative thereof. These derivatives can be formed prior to the principal reaction of the present invention or can be formed thereafter via conventional methods, preferably prior thereto.

The compounds of the present invention of the above formulas A–E possess estrogenic activity and are useful in the treatment of the various conditions in which such agents are indicated, such as estrogen deficiencies, menopause, and the like. These compounds can be used in veterinary medicine in the same manner as known steroidal estrogens such as estradiol and mestranol. For example the compounds of the present invention can be used in conjunction with a progestational agent for the control of fertility, see for example U.S. Patent 3,328,432. They can be administered either orally or percutaneously together with conventional excipients at dosage rates of from about 3 μg. to about 2 mg./kg./day. However, dosages below or above this range can also be used, the most favorable dosage being dependent upon the purpose for which it is administered and the response thereto. The compounds of Formulas A–E can also be used in the control of pests, e.g. rodents such as rats, in the same manner as known estrogens.

The compounds of Formulas A and B above of the present invention have a double bond at C–17 giving rise to cis or trans isomers. Each of the isomers is included within the scope of this invention and can be separated from the reaction mixture via conventional techniques such as chromatography.

Suitable methods for the preparation of the compounds of Formula I to obtain the compounds of Formula II are set forth in, for example, U.S. Patents 3,256,273, 3,262,949, 3,290,297, 3,300,484, 3,318,925, 3,318,928, 3,345,386 and 3,346,570 and Belgium Patent 681,255 (1966.). Compounds of Formula I having an 18-alkyl group can also be obtained by treatment of an 18-alkylestra-1,3,5(10)-triene with lead tetraacetate [Journal of the American Chemical Society, 80, 5683 (1958)] followed by treatment with trifluoroacetic anhydride [Chemische Berichte, 97, 1926 (1964)].

The following examples are provided to illustrate the practice of the present invention.

EXAMPLE 1

A mixture of 10 g. of 3-methoxy-17α-(1'-propynyl)-estra-1,3,5(10)-trien-17β-ol, 500 ml. of acetic acid, 100 ml. of acetic anhydride and 10 g. of p-toluenesulfonic acid is stirred at room temperature of about 1.3 hours. Water (about 2 l.) is then added and the mixture filtered. The residue collected is washed to neutrality and dried to afford 3-methoxy-17-(1'-propynyl)-estra-1,3,5 (10),16-tetraene which can be further purified by recrystallization from methanol, if desired.

By repeating the above process using 3-methoxy-17α-ethynylestra-1,3,5(10)-trien-17β-ol,
17α-(1'-propynyl)-estra-1,3,5(10)-triene-1,3,17β-triol,
3 - methoxy - 7α - methyl - 17α - (1' - propynyl) - estra-1,3,5(10)-trien-17β-ol, and
3 - methoxy - 1 - methyl - 17α - (1' - propynyl) - estra-1,3,5(10)-trien-17β-ol as the starting material, there is obtained 3-methoxy-17-ethynylestra-1,3,5(10),16-tetraene,
17 - (1' - propynyl) - estra - 1,3,5(10),16 - tetraene - 1,3-diol,
3 - methoxy - 7α - methyl-17 - (1' - propynyl) - estra - 1,3,5(10),16-tetraene, and
3 - methoxy - 1 - methyl - 17 - (1' - propynyl) - estra-1,3,5(10),16-tetraene, respectively.

EXAMPLE 2

A mixture of 6 g. of 3-methoxy-17-(1'-propynyl)-estra-1,3,5(10),16-tetraene and 2-molar equivalents of sodium chlorodifluoroacetate in 240 ml. of diglyme under nitrogen is heated at reflux temperature for 15 minutes and then cooled to below 100° C. An additional 2 molar equivalents of sodium chlorodifluoroacetate is added and the resulting mixture refluxed for 15 minutes. This procedure is repeated until a total of 8 molar equivalents of sodium chlorodifluoroacetate is added. Then the reaction mixture is cooled, filtered, and the filtrate evaporated in vacuo. The residue is chromatographed on Florisil (synthetic magnesium silicate) eluting with:

(1) hexane:ether (95:5) to give a first fraction containing

3 - methoxy - 16α,17α - (difluoromethylene) - 17β - (1'-propynyl) - estra - 1,3,5(10) - triene,
3 - methoxy-17 - (2' - fluoro - 3' - methylcyclopropenylidenyl)-estra-1,3,5(10),15-tetraene,
3 - methoxy - 16α - fluoro - 17 - (2' - fluoro - 3( - methylcyclopropenylidenyl)-estra-1,3,5(10)-triene and some starting material;

(2) hexane:ether (70:30) to give a second fraction consisting of 3-methoxy-17-(2'-fluoro-3'-methylcyclopropenylidenyl)-estra-1,3,5(10)-trien-16α-ol; and (3) ether:ethyl acetate (90:10) to give a third fraction containing 3 - methoxy - 16α,17α -(difluoromethylene) - 17β - (3'-methylcyclopropenon-2'-yl)-estra-1,3,5(10)-triene and
3 - methoxy - 17 - (3' - methylcyclopropenon - 2' - yl)-estra - 1,3,5(10),16-tetraene, Fractions 1 and 3 above are further separated by chromatography to obtain the individual compounds which are further purified by recrystallization.

By repeating the process of this example using an equivalent amount of sodium trichloroacetate in place of sodium chlorodifluoroacetate, the corresponding chloro derivatives are obtained.

EXAMPLE 3

A mixture of 270 mg. of 3-methoxy-17-(2'-fluoro-3'-methylcyclopropenylidene)-estra-1,3,5(10)-trien-16α - ol, 6.5 ml. of pyridine and 270 mg. of chromium trioxide pyridine complex is stirred for about 16 hours at room temperature. The reaction mixture is then filtered. To the filtrate is added neutral alumina and the mixture is stirred 30 minutes and then filtered. The filtrate is poured into water and the resulting mixture extracted with benzene. The benzene extract is washed to neutrality with water, dried over sodium sulfate and evaporated to dryness to afford 3 - methoxy-17-(2'-fluoro-3'-methylcyclopropenylidene)-estra-1,3,5(10)-trien-16-one.

EXAMPLE 4

One gram of 3-methoxy-17-(2'-fluoro-3'-methylcyclopropenylidenyl) - estra - 1,3,5(10),15-tetraene in 50 ml. of ethyl acetate is hydrogenated using 0.3 g. of 5% palladium-on-charcoal catalyst at room temperature until one equivalent of hydrogen is taken up. The catalyst is then removed by filtration and the filtrate evaporated to give 3 - methoxy - 17 - (2' - fluoro - 3' - methylcyclopropenylidenyl) - estra - 1,3,5(10) - triene which can be purified by chromatography or recrystallization.

EXAMPLE 5

A mixture of 1 g. of 17-(1'-propynyl)-estra-1,3,5,(10), 16-tetraene-1,3,-diol, 1 g. of p-toluenesulfonic acid monohydate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 1,3-diacetoxy-17 - (1' - propynyl) - estra - 1,3,5(10),16 - tetraene which is recrystallized from acetone:ether.

The above prepared 1,3 - diacetoxy - 17 - (1' - propynyl) - estra - 1,3,5(10),16 - tetraene is subjected to the process of Example 2 to afford 1,3-diacetoxy-16α,17α-(difluoromethylene) - 17β - (1' - propynyl) - estra - 1,3, 5(10) - triene, 1,3 - diacetoxy - 17 - (2' - fluoro -3'-methylcyclopropenylidenyl)-estra-1,3,5,(10),15-tetraene, 1, 3-diacetoxy - 16α - fluoro - 17 - (2' - fluoro - 3' - methylcyclopropenylidenyl) - estra - 1,3,5(10) -triene, 1, 3-diacetoxy - 17 - (2' - fluoro - 3' - methylcyclopropenylidenyl) - estra - 1,3,5(10) - trien - 16α - ol, 1,3 - diacetoxy - 16α,17α - (difluoromethylene) - 17β - (3' - methylcyoclopropenon - 2' - yl) - estra - 1,3,5(10) - triene and 1,3 - diacetoxy - 17 - (3' - methylcyclopropenon - 2'-yl)-estra-1,3,5(10),16-tetraene.

By repeating the process of Example 3 using 1,3-diacetoxy - 17 - (2' - fluoro - 3' - methylcyclopropenylidenyl) - estra - 1,3,5(10) - trien - 16α -ol as the starting material, there is obtained 1,3-diacetoxy-17-(2'-fluoro-3'-methylcyclopropenylidenyl) - estra - 1,3,5(10) -trien - 16-one.

By using 1,3-diacetoxy-17-)2'-fluoro-3' - methylcyclopropenylidenyl) - estra - 1,3,5(10),15 - tetraene as the starting material in Example 4, there is obtained 1,3-diacetoxy - 17 - (2' - fluoro - 3' - methylcyclopropenylidenyl) -estra-1,3,5(10) -triene.

EXAMPLE 6

One gram of 1,3-diacetoxy-16α-fluoro-17-(2'-fluoro-3'-methylcyclopropenylidenyl) - estra - 1,3,5(10) - triene is allowed to stand at room temperature for 15 hours, with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 16α-fluoro-17-(2' - fluoro - 3' - methylcyclopropenylidenyl) - estra - 1, 3,5(10)-triene-1,3-diol which is collected by filtration and recrystallized from acetone:hexane.

EXAMPLE 7

One gram of 1,3-diacetoxy-17-(1'-propynyl)-estra-1,3, 5(10),16-tetraene is allowed to stand at room temperature for 15 hours with 100 mg. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 1-acetoxy-17-(1'-propynyl)-estra-1,3,5,(10), 16-tetraen-3-ol which is collected by filtration and recrystallized from acetone:hexane.

A solution of one chemical equivalent of the above prepared 3-hydroxy compound in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 3 - cyclopentyloxy - 1 - acetoxy - 17 - (1' - propynyl)- estra-1,3,5,(10),16-tetraene which is further purified upon recrystallization from pentane.

A solution of 0.17 g. of potassium hydroxide in 0.2 ml. of water and 2.5 ml. of methanol is added over 30 minutes to a refluxing solution of 1 g. of the above 3-cyclopentyloxy compound in 30 ml. of methanol under nitrogen. The solution is refluxed for two hours, cooled, neutralized with acetic acid and concentrated under reduced pressure. After the addition of water, the solid which forms is collected by filtration and dried to yield 3 - cyclopentyloxy - 17 - (1' - propynyl)-estra-1,3,5(10), 16 - tetraen-1-ol which is recrystallized from acetone: hexane.

The above obtained 17-(1'-propynyl) compounds [1-acetoxy - 17 - (1' - propynyl) - estra - 1,3,5(10), 16-tetraen - 3 - ol, 3 - cyclopentyloxy-1-acetoxy-17-(1'- propynyl) - estra - 1,3,5(10), 16-tetraene and 3-cyclopentyloxy - 17 - (1' - propynyl)-estra-1,3,5(10),16-tetraen-1-ol] are used as the starting material in the process of Example 2 and the corresponding products are obtained.

EXAMPLE 8

A solution of 1.5 g of 17-1(1'-propynyl)-estra-1,3,5 (10),16-tetraene-1,3-diol in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1,3-dicyclopentyloxy-17-(1'-propynyl)-estra-1,3,5(10),16 - tetraene which is further purified upon recrystallization from pentane.

EXAMPLE 9

Four millileters of dihydofuran is added to a solution of 1 g. of 17-(1'-propynyl)-estra-1,3,5(10),16-tetraene-1, 3-diol in 15 ml. of benzene. About 1 ml. is removed by distillation to remove moisture and 0.4 g. of p-toluene-sulfonic acid is added to the cooled solution. The mixture is allowed to stand at room temperature for four days, and is then washed with aqueous sodium carbonate solution and water, dried and evaporated. The residue is chromatographed on neutral alumina, eluting with hexane, to yield 1,3-(ditetrahydrofuran-2'-yloxy) - 17 - (1'-propynyl)-estra-1,3,5(10),16-tetraene which is recrystallized from pentane.

Use of this procedure with the other free hydroxy compounds of the present invention will similarly yield the corresponding (tetrahydofuran-2'-yloxy) derivatives. Likewise, through the use of dihydropyran in place of dihydrofuran, the corresponding tetrahydropyran-2'-yl ethers are obtained.

What is claimed is:

1. A compound selected from those of the formulas:

(A)

(B)

(C)

(D)

(E)

wherein,
X is chloro or fluoro;
R is methyl or ethyl;
$R^1$ is hydroxy and the hydrolyzable esters thereof, lower alkoxy, tetrahydropyran-2'-yloxy, tetrahydrofuran-2'-yloxy, cyclopentyloxy or cyclohexyloxy;
$R_2$ is hydrogen, methyl, hydroxy and the hydrolyzable esters thereof, lower alkoxy, tetrahydropyran-2'-yloxy, tetrahydrofuran-2'-yloxy, cyclopentyloxy or cyclohexyloxy;
$R^3$ is hydrogen or methyl;
$R^4$ is oxo or the group $$\begin{array}{c} R^5 \\ \vdots \\ -H \end{array}$$

in which $R^5$ is hydrogen, hydroxy and the hydrolyzable esters thereof, chloro or fluoro; and
$R^6$ is hydrogen or methyl.

2. A compound according to Formula A of claim 1 wherein X is fluoro, R is methyl, $R^1$ is methoxy, $R^2$ is hydrogen, $R^3$ is methyl, $R^4$ is the group $$\begin{array}{c} R^5 \\ \vdots \\ -H \end{array}$$

in which $R^5$ is hydrogen and $R^6$ is hydrogen.

3. A compound according to Formula A of claim 1 wherein X is fluoro, R is methyl, $R^1$ is methoxy, $R^2$ is hydrogen, $R^3$ is methyl, $R^4$ is the group $$\begin{array}{c} R^5 \\ \vdots \\ -H \end{array}$$

in which $R^5$ is fluoro and $R^6$ is hydrogen.

4. A compound according to Formula A of claim 1 wherein X is fluoro, R is methyl, $R^1$ is methoxy, $R^2$ is hydrogen, $R^3$ is methyl, $R^4$ is oxo and $R^6$ is hydrogen.

5. A compound according to Formula A of claim 1 wherein X is fluoro, R is methyl, $R^1$ is methoxy, $R^2$ is hydrogen, $R^3$ is methyl, $R^4$ is the group $$\begin{array}{c} R^5 \\ \vdots \\ -H \end{array}$$

in which $R^5$ is hydroxy and $R^6$ is hydrogen.

6. A compound according to Formula A of claim 1 wherein X is fluoro, R is methyl, each of $R^1$ and $R^2$ is dihydroxy, $R^3$ is methyl, $R^4$ is the group $$\begin{array}{c} R^5 \\ \vdots \\ -H \end{array}$$

in which $R^5$ is hydrogen or fluoro and $R^6$ is hydrogen.

7. A compound according to Formula A of claim 1 wherein X is fluoro, R is methyl, $R^1$ is methoxy, $R^2$ is hydrogen, $R^3$ is methyl, $R^4$ is the group $$\begin{array}{c} R^5 \\ \vdots \\ -H \end{array}$$

in which $R^5$ is hydrogen or fluoro and $R^6$ is methyl.

8. A compound according to Formula B of claim 1 wherein X is fluoro, R is methyl, $R^1$ is methoxy, $R^2$ is hydrogen, $R^3$ is methyl and $R^6$ is hydrogen.

9. A compound according to Formula B of claim 1 wherein X is fluoro, R is methyl, each of $R^1$ and $R^2$ is hydroxy, $R^3$ is methyl and $R^6$ is hydrogen.

10. A compound according to Formula B in claim 1 wherein X is fluoro, R is methyl, $R^1$ is methoxy, $R^2$ is hydrogen, and each of $R^3$ and $R^6$ is methyl.

11. A compound according to Formula C of claim 1 wherein R is methyl, $R^1$ is methoxy, $R^2$ is hydrogen, $R^3$ is methyl and $R^6$ is hydrogen.

12. A compound according to Formula C of claim 1 wherein R is methyl, each of $R^1$ and $R^2$ is hydroxy, $R^3$ is methyl and $R^6$ is hydrogen.

13. A compound according to Formula C of claim 1 wherein R is methyl, $R^1$ is methoxy, $R^2$ is hydrogen and each of $R^3$ and $R^6$ is methyl.

14. A compound according to Formula D of claim 1 wherein X is fluoro, R is methyl, $R^1$ is methoxy, $R^2$ is hydrogen, $R^3$ is methyl and $R^6$ is hydrogen.

15. A compound according to Formula D of claim 1 wherein X is fluoro, R is methyl, each of $R^1$ and $R^2$ is hydroxy, $R^3$ is methyl and $R^6$ is hydrogen.

16. A compound according to Formula D of claim 1 wherein X is fluoro, R is methyl, $R^1$ is methoxy, $R^2$ is hydrogen, and each of $R^3$ and $R^6$ is methyl.

17. A compound according to Formula E of claim 1 wherein X is fluoro, R is methyl, $R^1$ is methoxy, $R^2$ is hydrogen, $R^3$ is methyl and $R^6$ is hydrogen.

18. A compound according to Formula E of claim 1 wherein X is fluoro, R is methyl, each of $R^1$ and $R^2$ is hydroxy, $R^3$ is methyl and $R^6$ is hydrogen.

19. A compound according to Formula E of claim 1 wherein X is fluoro, R is methyl, $R^1$ is methoxy, $R^2$ is hydrogen, and each of $R^3$ and $R^6$ is methyl.

20. A compound selected from those of the formula:

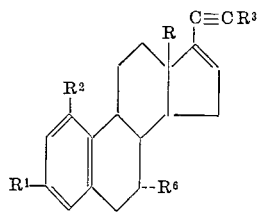

wherein,

R is methyl or ethyl;

$R^1$ is hydroxy and the hydrolyzable esters thereof, lower alkoxy, tetrahydropyran-2'-yloxy, tetrahydrofuran-2'-yloxy, cyclopentyloxy or cyclohexyloxy;

$R^2$ is hydrogen, methyl, hydroxy and the hydrolyzable esters thereof, lower alkoxy, tetrahydropyran-2'-yloxy, tetrahydrofuran-2'-yloxy, cyclopentyloxy or cyclohexyloxy;

$R^3$ is hydrogen or methyl; and $R^6$ is hydrogen or methyl.

21. A compound according to claim 20 wherein R is methyl, $R^1$ is methoxy, $R^2$ is hydrogen, $R^3$ is methyl and $R^6$ is hydrogen.

22. A compound according to claim 20 wherein R is methyl, each of $R^1$ and $R^2$ is hydroxy, $R^3$ is methyl and $R^6$ is hydrogen.

23. A compound according to claim 20 wherein R is methyl, $R^1$ is methoxy, $R^2$ is hydrogen and each of $R^3$ and $R^6$ is methyl.

References Cited

UNITED STATES PATENTS 3,435,056   3/1969   Edwards et al.

HENRY A. FRENCH, Primary Examiner

U.S. Cl. X.R.

260—239.5, 239.55, 397.5, 999

UNITED STATES PATENT OFFICE
CERTIFICATE OF CORRECTION

Patent No. 3,492,321    Dated January 27, 1970

Inventor(s) Pierre Crabbe

It is certified that error appears in the above-identified patent and that said Letters Patent are hereby corrected as shown below:

Column 1, lines 28 to 31, the portion of formula (B) reading:

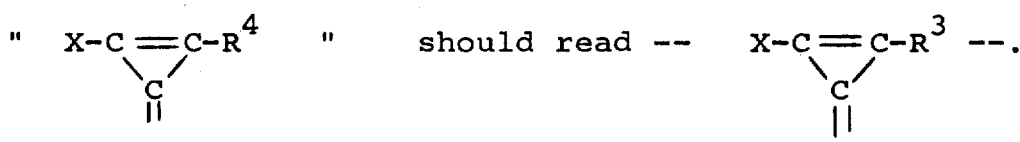

Column 1, lines 40 to 50, the portion of formula (C) reading:

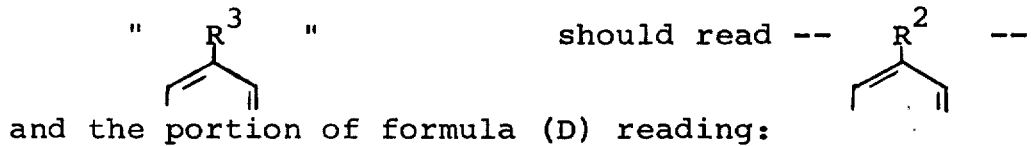

and the portion of formula (D) reading:

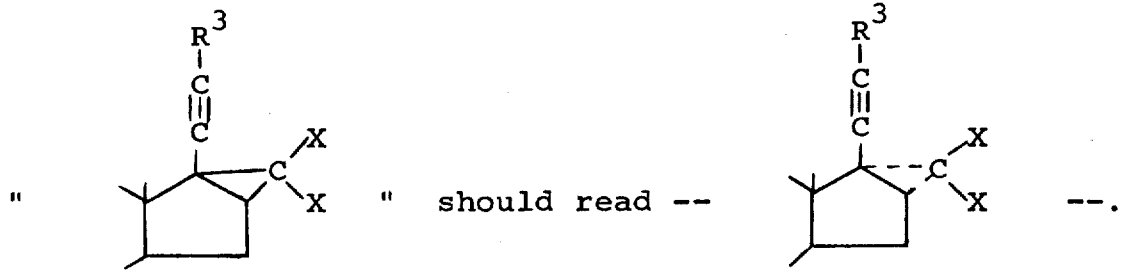

Column 1, lines 57 to 61, the portion of formula (E) reading:

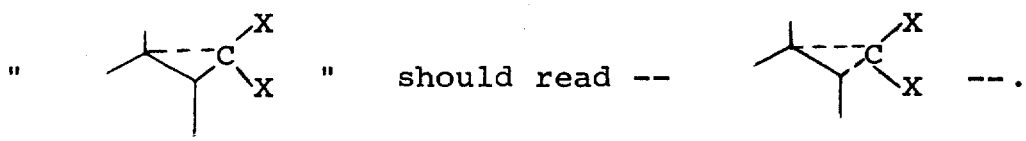

UNITED STATES PATENT OFFICE
CERTIFICATE OF CORRECTION

Patent No. 3,492,321   Dated January 27, 1970

Inventor(s) Pierre Crabbe   PAGE - 2

It is certified that error appears in the above-identified patent and that said Letters Patent are hereby corrected as shown below:

Column 2, line 56, "propynyl-estra" should read -- propynyl)-estra --.  Column 2, lines 57 to 68, formula II should appear as follows:

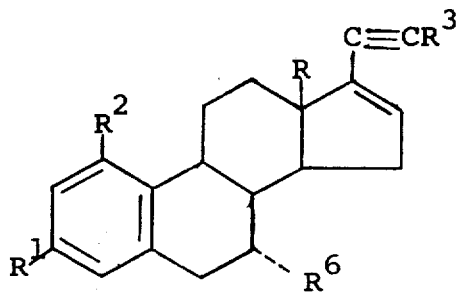

Column 2, line 70, "R, $R_1$, $R_2$, $R_3$ and $R_6$" should appear as -- R, $R^1$, $R^2$, $R^3$ and $R^6$ --.  Column 4, line 20, "of" should read -- for --.  Column 4, lines 63-64, "fluoro-3(-methylcyclopropenylidenyl" should read -- fluoro-3'-methylcyclopropenylidenyl --.  Column 5, line 37, "hydate" should read -- hydrate --.  Column 5, line 63, "17-)2'-fluoro" should read -- 17-(2'-fluoro --.  Column 6, line 51, "17-1(1'-" should read -- 17-(1'- --.  Column 7, lines 15 to 21, the portion of formula (A) reading:

" 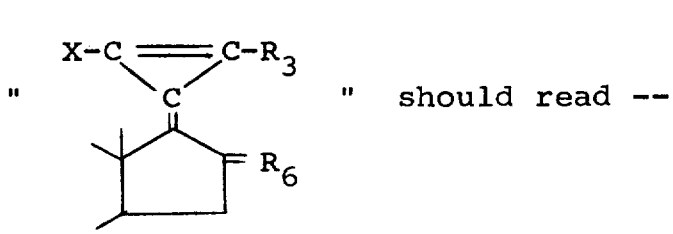 " should read -- 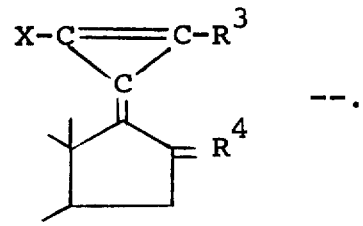 --.

UNITED STATES PATENT OFFICE
CERTIFICATE OF CORRECTION

Patent No. 3,492,321      Dated January 27, 1970

Inventor(s) Pierre Crabbe      PAGE - 3

It is certified that error appears in the above-identified patent and that said Letters Patent are hereby corrected as shown below:

Column 6, lines 29 to 35, the portion of formula (D) reading:

" 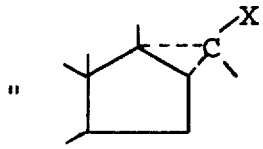 " should read -- 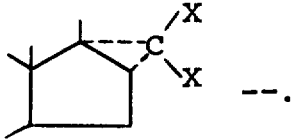 --.

Column 7, line 64, "$R_2$" should read -- $R^2$ --. Column 8, line 49, "in" should read -- of --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents